Oct. 6, 1931.  H. V. REED  1,825,979
FRICTION CLUTCH
Filed Jan. 3, 1927   2 Sheets-Sheet 2
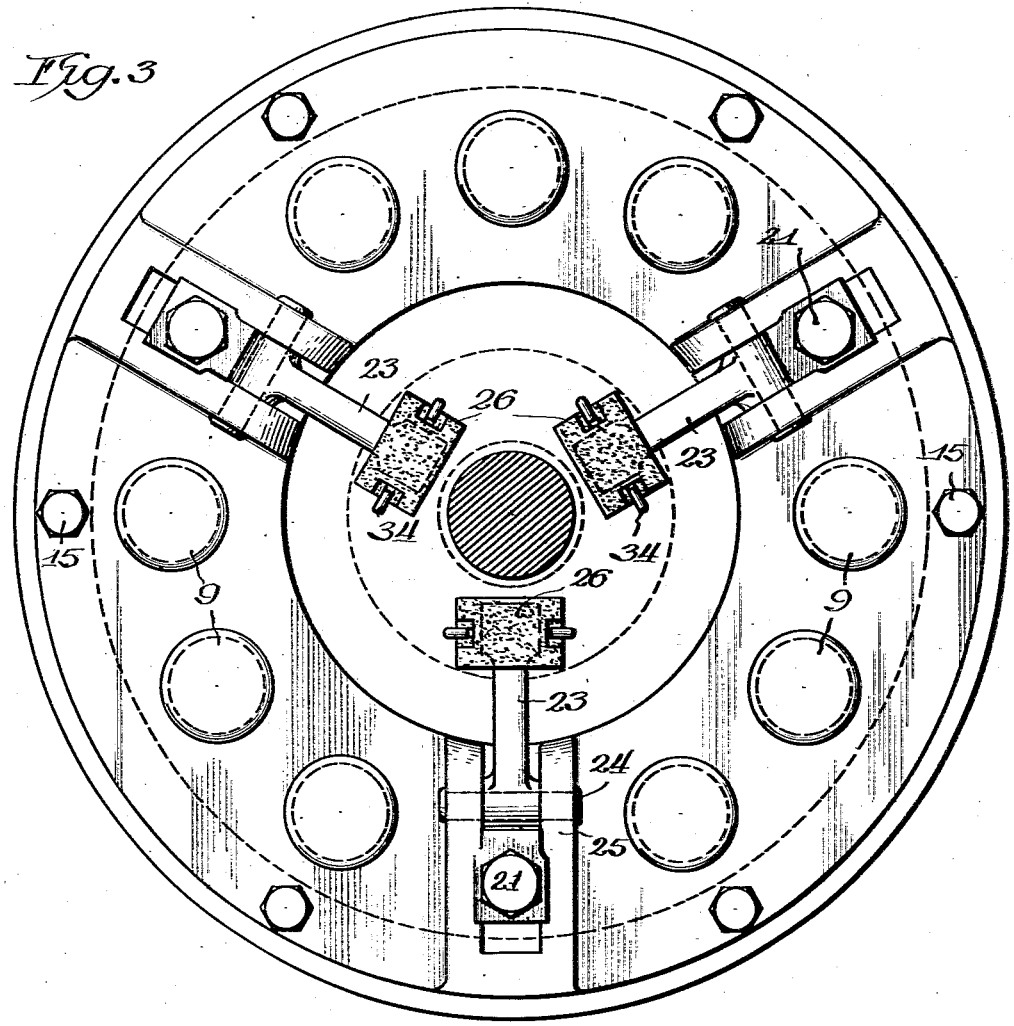
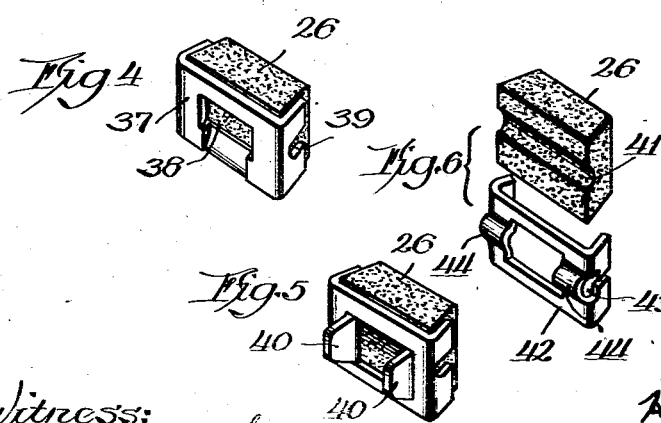

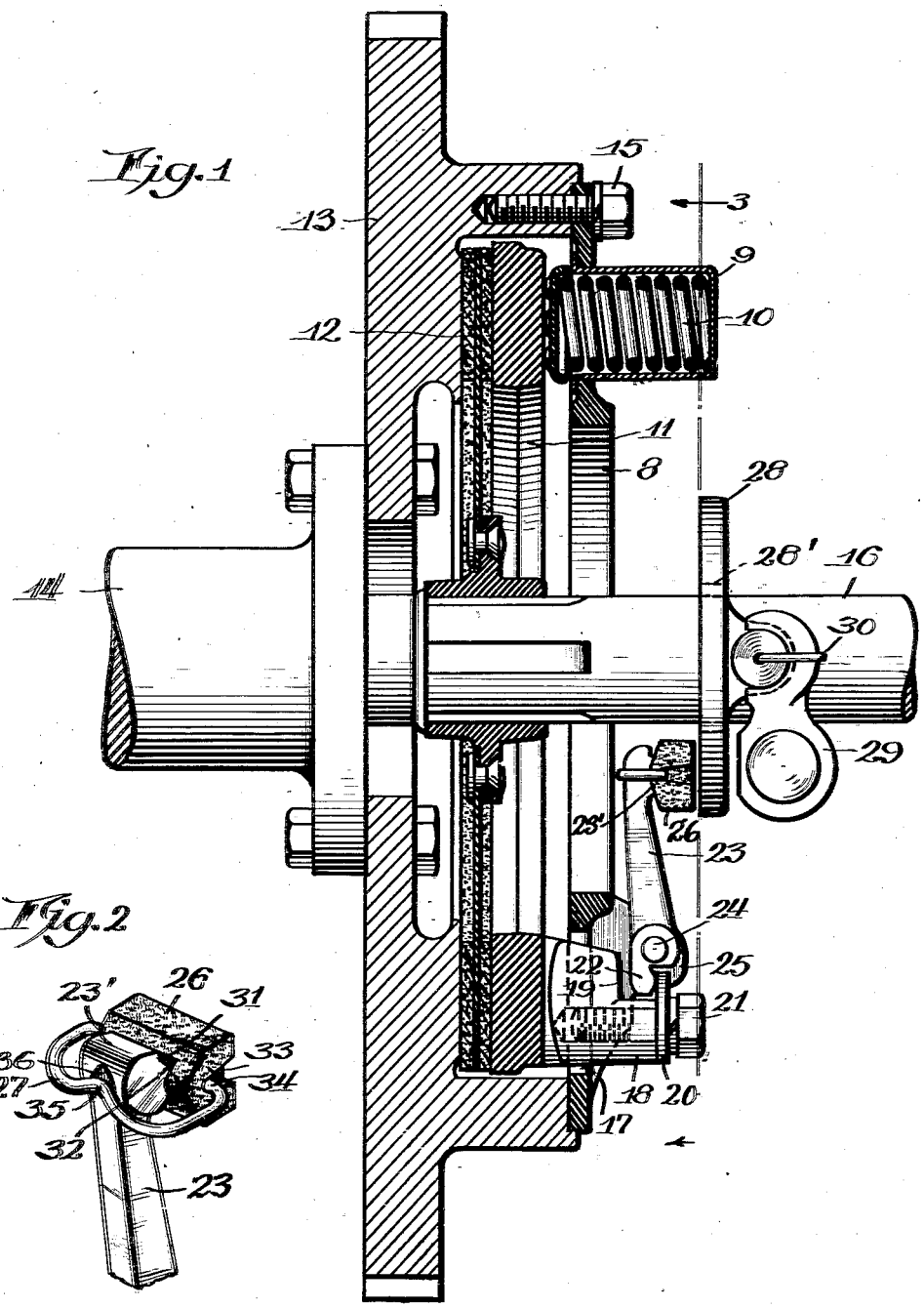

Patented Oct. 6, 1931

1,825,979

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed January 3, 1927. Serial No. 158,502.

This invention relates to that type of friction clutch in which the friction members are engaged under direct action of springs and are disengaged by release levers.

Heretofore the clutch release lever in this type of clutch has always operated upon a ball thrust bearing which must be maintained by means of a suitable guide and other devices in a definite relation normal to and concentric with the driven shaft. This ball thrust bearing requires lubrication which is often difficult to provide and maintain.

One of the objects of this invention is to dispense with the ball thrust bearing and to substitute a bearing which does not require any guiding means on the transmission case or any lubrication.

A further object of the invention is to provide clutch release means of simple construction which can be readily adapted to direct spring acting clutches and in which the wearing parts can be quickly and readily replaced with comparatively little cost.

The invention also has other objects in view which will appear hereafter in the detail description of the embodiment of the invention selected for illustration in the accompanying drawings in which:

Fig. 1 is a sectional view of a direct spring acting clutch showing the invention therein.

Fig. 2 is a detail perspective view of one of the clutch levers and its antifriction shoe.

Fig. 3 is a sectional view on line 3—3 of Fig. 1.

Figs. 4, 5 and 6 are detail perspective views of different forms of antifriction shoes.

Referring to the drawings 8 is the cover plate of the clutch and it is provided with sockets 9 to receive springs 10 which bear directly upon the thrust or pressure ring 11 and press the friction faced clutch or driven plate 12 into engagement with the fly-wheel 13 which is made fast to the driving or crank shaft 14. The cover plate is secured to the fly-wheel by bolts 15 and the clutch plate 12 is splined on the driven shaft 16.

The cover plate is provided with a plurality of openings 17 to accommodate posts 18 rigid with and projecting outwardly from the thrust or pressure ring 11. These posts are recessed at 19 and plates 20 are secured to the posts by bolts 21 and project over the recesses 19 to form stops which are engaged by the projections 22 on the clutch levers or fingers 23 which are pivoted at 24 in ears 25 rigid with the cover plate. The free inner ends 23' of the clutch levers carry shoes 26 of some suitable antifriction bearing material such as a graphite composition, and these shoes are removably held on the levers by wire bails 27 (Fig. 2). Instead of the usual ball thrust bearing which must be mounted and guided in perfect concentric relation on the driven shaft I provide a thrust release plate 28, Fig. 1, which is carried by the release lever yoke 29. This plate may be held on the yoke by spring devices 30, as more fully disclosed in my Patent 1,611,557 patented December 21, 1926.

Each shoe 26 is mounted pivotally on its clutch lever so that it may automatically adjust itself to make full contact of its outer face with the release plate 28. For this purpose the shoe is provided at the back with a bearing recess 31 to receive a rounded projection 32 on the clutch lever. The shoe pivots freely on the rounded projection 32 and automatically adjusts itself as may be required to flatly engage the release plate 28 and make full contact therewith. The shoe also has recesses 33 in its ends to receive the inturned ends 34 of the bail and the latter is indented at 35 to engage a recess 36 in the clutch lever whereby the bail is held in place on said lever (Fig. 2). The antifriction shoe may be readily applied to the lever and replaced whenever it becomes necessary because of wear or for other reasons. Since the shoe readily and automatically adjust themselves to make full contact with the release plate it is not necessary that this release plate should be guided to maintain a fixed relation to the driven shaft and therefore the opening 28' in the release plate to receive the driven shaft may be considerably larger than the shaft. It is customary to provide three of the clutch levers and these are distributed symmetrically about the cover plate so that the shoes will be located in equi-distant spaced relation for contact with the release plate. The spaced arrangement of the shoes provides a ventilation therefor which tends to reduce the temperature of the shoes. The shoes revolve with the driving member of the clutch at a relatively high rate of speed and create an agitation and circulation of the air which tends to cool the shoes.

Referring to Figs. 4-6, the shoes may be slidably engaged with a metal holder 37 which is provided with an opening 38 to receive the rounded projection 32 on the head or end of the lever, and also with recesses or slots 39 to receive the ends of the bail. In the construction of Fig. 2 the end walls of the recess 31 in the back of the shoe engage the sides of the end of the lever and cooperate with the bail in holding the shoe in proper position on the lever. In Fig. 4 the end walls of the opening 38 in the holder engage the sides of the end of the clutch lever. In Fig. 5 the holder is also provided with rearwardly extending ears 40 to engage the sides of the end of the clutch lever. In Fig. 6 the recess 41 at the back of the shoe extends from end to end thereof and the holder 42 has openings 43 at its ends to receive the ends of the bail which are disposed in the recess 41, the holder being shaped at 44 to co-operate with the recess 41 and form a socket for the ends of the bail.

In Figs. 1-6 the shoes are mounted independently on their respective clutch levers without the use of a pivot pin or similar connection and in a manner which provides for a direct pressure of the lever upon the shoe to effect engagement of the full area of the contact face of the shoe with the release plate. The bail is preferably made of spring wire which exerts a tension on the shoe sufficient to maintain it yieldingly in position on the lever, but permitting the shoe to adjust itself automatically as required to make full contact with the plate. The shoe does not swing freely on the lever, but the construction is such that it will remain in whatever position it may be set by reason of its engagement with the release plate.

My invention provides an improved friction clutch of simple construction which requires less fitting and can be made at less cost than clutches of this type heretofore known. My invention enables the elimination entirely of the usual ball thrust bearing, and thereby avoids the necessity for providing guiding means which have heretofore been employed to maintain the ball thrust bearing in its proper position on the driven shaft. The clutch release plate is not fitted to the driven shaft, but is freely movable thereon and the construction is such that the clutch may be easily applied to existing engine assemblies for which it may be adapted because it is not necessary to provide guiding means for the release plate. I employ a plurality of antifriction shoes, spaced apart, and independently mounted on the clutch levers so that each shoe will function independently of the other shoes. The spaced disposition of the shoes which revolve at a relatively high rate of speed about the driven shaft provides for an agitation and circulation of air which tends to cool the shoes and reduce the wear. The shoes are easily installed and removed so that replacements can be made quickly whenever it may be necessary.

To adapt my invention to various clutches it may be found necessary to make changes in the form, construction and arrangement of parts and I reserve the right to make all such changes as fairly fall within the scope of the following claims.

I claim:

1. In a friction clutch, the combination of a plurality of clutch levers, a clutch release device, said clutch levers as a unit and said device being relatively revoluble, and antifriction means interposed between the clutch levers and said device and comprising a plurality of shoes made of composition material, one shoe for each clutch lever, and means for mounting the shoes on the clutch levers so that they may automatically and bodily adjust themselves with relation to the levers for proper contact with said device.

2. In a friction clutch, the combination of a plurality of radially disposed clutch levers, a clutch release device arranged in parallel relation with the pivots of said levers, and antifriction shoes independently mounted on the free inner ends of said clutch levers and bodily adjustable relative thereto to directly engage said release device.

3. In a friction clutch, the combination of a plurality of radially disposed clutch levers, a clutch release device arranged in parallel relation with the pivots of said levers, and antifriction shoes independently mounted on the free inner ends of said clutch levers between said inner ends and the release device to directly engage said release device.

4. In a friction clutch, the combination of a clutch lever, a clutch release device, an antifriction shoe mounted on said lever to directly engage said device, said lever having a rounded projection on its side adjacent said release device and said antifriction shoe having a recess to receive said projection to permit movement of the shoe relative to the lever, and means for detachably clamping the shoe on the lever.

5. In a friction clutch, the combination of a plurality of radially disposed clutch levers, a clutch release device arranged in parallel relation with the pivots of said levers, antifriction shoes interposed between the free inner ends of said levers and said release device, and clamping means detachably securing said shoes on the free ends of said levers.

6. In a friction clutch, the combination of a plurality of clutch levers and antifriction shoes, and yielding means for holding the shoes on the free ends of the levers.

7. In a friction clutch, the combination of a clutch lever and an antifriction shoe, said shoe having a recess and said lever having a projection to engage said recess to enable the shoe to adjust itself pivotally on the lever, and yielding means for holding the shoe on the lever.

8. In a friction clutch, the combination of a clutch lever, an antifriction shoe, and a spring bail engaging the lever and shoe for holding the shoe on the lever.

9. In a friction clutch, the combination of a clutch lever, an antifriction shoe having recesses at its ends, and a spring bail engaged with the lever and having its ends engaged in the recesses in the shoe for holding the shoe on the lever.

10. In a friction clutch, the combination of a clutch lever, an antifriction shoe, said lever having a recess, and a spring bail engaged with said recess in the lever and also engaged with the shoe for holding the shoe on the lever.

HAROLD V. REED.